United States Patent [19]

Holzmann

[11] 4,145,075

[45] Mar. 20, 1979

[54] CLAMPING DEVICE FOR CABLES, LEADS, HOSES OR THE LIKE

[75] Inventor: Hermann Holzmann, Stuttgart, Fed. Rep. of Germany

[73] Assignee: U. I. Lapp K.G., Stuttgart, Fed. Rep. of Germany

[21] Appl. No.: 814,855

[22] Filed: Jul. 12, 1977

[30] Foreign Application Priority Data

Jul. 16, 1976 [DE] Fed. Rep. of Germany ....... 2631996
May 5, 1977 [DE] Fed. Rep. of Germany ....... 2720137

[51] Int. Cl.² ............................................. F16L 19/00
[52] U.S. Cl. ..................................... 285/81; 285/161; 285/322; 285/354
[58] Field of Search ................... 285/322, 161, 81, 92, 285/354 (U.S. only); 339/DIG. 2; 174/65 SS; 151/19 R, 19 A, 9, 10

[56] References Cited

U.S. PATENT DOCUMENTS

| 1,257,852 | 2/1918 | Hall | 285/322 X |
| 1,959,079 | 5/1934 | Holt | 285/343 X |
| 2,540,368 | 2/1951 | Harding | 285/343 |
| 3,104,120 | 9/1963 | Myers | 285/161 |
| 3,633,944 | 1/1972 | Hamburg | 285/81 |
| 3,895,832 | 7/1975 | Ellis et al. | 285/343 X |
| 3,913,956 | 10/1975 | Eidelberg et al. | 285/343 |

FOREIGN PATENT DOCUMENTS

384700 12/1932 United Kingdom .................... 285/322

*Primary Examiner*—Thomas F. Callaghan
*Attorney, Agent, or Firm*—Shenier & O'Connor

[57] ABSTRACT

An anchoring or clamping device for cables, hoses and the like. The device has a hollow cylindrical socket portion for receiving the cable to be clamped, which socket portion has clamping tongues at one of its ends. A screw-threaded member is adapted to fit over that end of the socket provided with the clamping tongues to deform the tongues which then close on the cable and anchor it in position. A gasket is arranged between the clamping tongues and the cable.

8 Claims, 9 Drawing Figures

Fig. 5
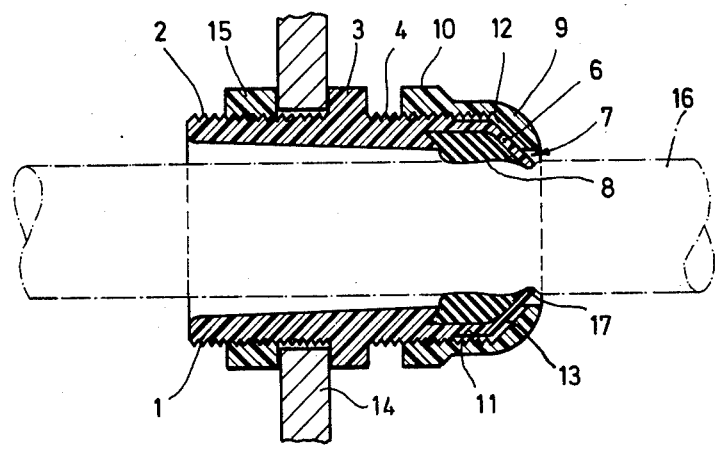
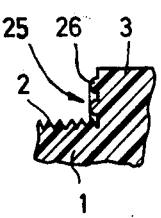
Fig. 6
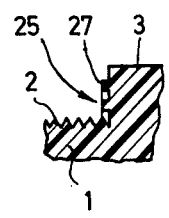
Fig. 7
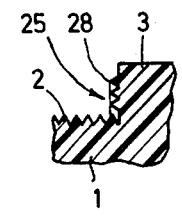
Fig. 8
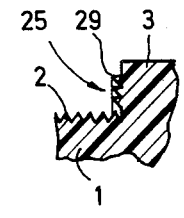
Fig. 9

CLAMPING DEVICE FOR CABLES, LEADS, HOSES OR THE LIKE

The invention relates to a clamping device for cables, leads, hoses or the like.

Devices of this type for holding cables, leads, hoses and other usually flexible cord-like or filamentary products are known in various forms. They serve for example for leading cables or electrical leads from housings and at the same time porviding a seal therewith.

In the case of known holding devices, satisfactory strain relief of the cable object to be anchored or clamped is not obtained. Thus, special strain relief elements for cable mountings, in particular screw-type cable fittings are already known, for example in the form of metal or plastics cable clips, in order to clamp the cable or the like to be fixed against strain. However, the number of elements necessary for satisfactory strain relief require time-consuming assembly and complicated stock keeping. Moreover, such elements are easily lost. In the case of strain relief using clamping straps, damage to the cable insulation can arise because of high local pressure, so that there is the danger of contact with current-carrying parts by the user of the holder. In the case of plastics straps, this danger does not exist, but the user can slightly injure himself on the projecting screws, which are necessary for clamping the straps.

Furthermore, known holding or clamping devices such as screw-type cable fittings, have the drawback of a complicated construction, large space requirements and component parts which are easily lost. In addition, in the case of a screw-type cable fitting, the pressing screw does not secure against rotation relative to the mounting socket.

In accordance with the invention, clamping tongues are formed integrally with the end of a mounting socket associated with a pressure element, so that when the pressure element is disposed the tongues are deformed and press against the cable or the like and thus provide strain relief, between the clamping tongues and cable or the like there being disposed a hollow cylindrical gasket which is pressed against the cable by the clamping tongues.

The advantage of protection against rotation may be attained in the device, in that the pressure element is in the form of a pressing screw which is screwable onto an external thread of the mounting socket, the interior of the pressing screw having grooving, toothing or the like which may be brought into engagement with the clamping tongues and prevent any undesirable rotation of the pressing screw.

The invention will now be described by way of example with reference to the accompanying drawings in which:

FIG. 5 is a section through the assembly of the parts shown in FIGS. 1 to 4, and FIGS. 6 to 9 are detailed sections through a pressure collar with seal profiling.

Figure 1:
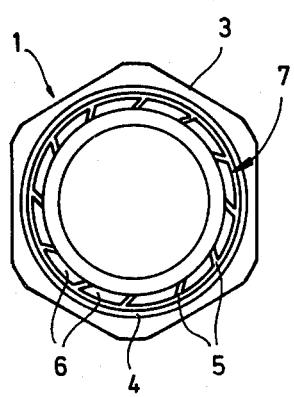
FIG. 1 is a front view of a mounting socket.
Figure 2:
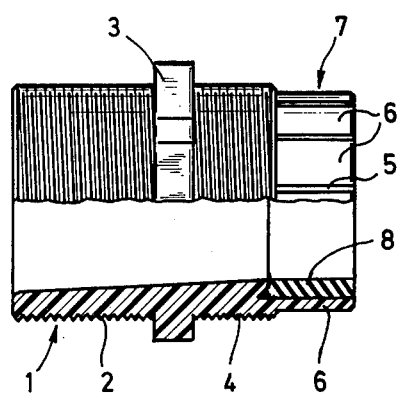
FIG. 2 is a partial sectional side view of the mounting socket of FIG. 1.

The hollow cylindrical mounting socket 1 shown in FIGS. 1 and 2 consists of tough resilient plastics, in particular polyamide. The socket 1 is provided with an external connecting thread 2 and a pressure collar 3 in the form of a hexagonal collar necessary for mounting on the wall 14 of a housing (see FIG. 5). An external thread 4 extends from the collar 3 for mounting a pressing screw 9 (FIGS. 3, 4 and 5).

The mounting socket 1 is provided with several clamping tongues 6 integral and coaxial therewith. The tongues 6 extend to the external thread 4 and are separated by inclined slots 5. The clamping tongues 6 and slots 5 alternate with each other and together form a clamping collar 7, in which a hollow cylindrical gasket 8 is inserted coaxially. As shown in FIG. 2, the mounting socket 1 comprises an undercut at its point of contact with the clamping tongues 6, and in which the gasket 8 engages. In this manner, and by means of the clamping tongues 6, the gasket 8 is undetachably held in place.

Figure 3:
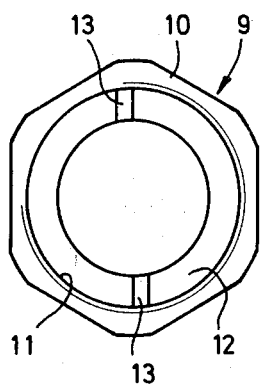
FIG. 3 is a front view of a pressing screw.
Figure 4:
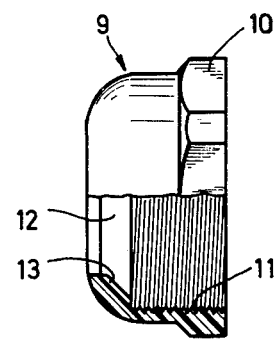
FIG. 4 is a partially sectional side view of the pressing screw of FIG. 3.

The pressing screw 9 in the form of a cap nut shown in FIGS. 3 and 4 comprises a hexagonal collar 10 and an internal thread 11 by which the pressing screw 9 can be screwed onto the external thread 4. The inner end of the pressing screw 9 is of dome or truncated conical shape to form an inwardly directed cam surface which cooperates with the free ends of the clamping tongues 6, as will be described hereinafter. Grooving or toothing 13 is preferably provided on this inner end extending obliquely to the axis of the nut, and serves to provide rotation protection between the socket 1 and screw 9 in cooperation with the ends of the clamping tongues 6.

FIG. 5 illustrates how the hollow cylindrical mounting socket 1 may be fixed onto the wall of a housing 14 by the connection thread 2, the pressure collar 3 being supported against the wall and secured by a locking nut 15. On screwing the pressing screw 9 on the external thread 4 of the intermediate socket portion, the two parts 1 and 9 become connected together with the clamping teeth 6 resting on the inclined or dome shaped inner end of the pressing screw which forms a support 12, and they gradually move towards the middle of the holding device in a fan formation as the pressing screw 9 is screwed up. By this means, the clamping collar 7 formed by the ends of the clamping tongues 6 is brought peripherally against the cable 16 inserted into the holding device, and strain relief for the cable is thus obtained. As the same time, the hollow cylindrical gasket 8 is pressed against the cable and provides the required seal.

By means of the fan-shaped partially mutually overlapping arrangement for the clamping tongues 6, a friction or form-fitting counter support is provided in the region of the grooving or toothing 13, in which the individual segments 17 of the toothing engage. The clamping collar 7 thus forms in the condition shown in FIG. 5 not only a strain relief but also protection against rotation of the pressing screw 9.

It will readily be appreciated that as the tongues 6 of member 1 come into engagement with cam surface 12 as threads 11 are screwed onto threads 4, the free ends of the tongues 6 are bent inwardly. In the course of this movement, owing to the shape of the slots 5 between the tongues 6, the free ends of the tongues overlap each other somewhat. Ultimately, the longitudinal edge of at least one of the overlapping tongue portions enters into the groove 13, so as to be in position to be engaged by a side of the groove to inhibit relative rotation between the two parts. It will readily be appreciated that the grooving or toothing 13 forms a step in the cam surface 12, which step is adapted to engage a longitudinal edge of an overlapping tooth portion when the member 9 is threaded onto the threads 4.

In order to obtain a reliable seal between the pressure collar 3 and the wall of the housing 14, the surface of the pressure collar 3 lying against the wall is provided with a seal profile 25, see FIGS. 6 to 9. This seal profile may comprise concentric, ring-shaped sealing ribs 26, 27 28 and 29 of rounded rectangular or triangular cross-section. The cross-section may also be in the form of a trapezium. In the embodiment of the invention shown in FIG. 1, the clamping tongues 6 are separated from each other by relatively wide slots 5. Instead of these slots, indentations or narrow cuts may be provided, so that the clamping tongues begin to slide over each other as the pressing screw 9 is screwed up earlier than in the case of the embodiments shown in FIGS. 1 and 2.

The clamping collar 7 of the embodiment of FIGS. 1 and 2, has a substantially cylindrical contour. On engaging with the inlined or domed inner end of the pressing screw, which acts as a support back rest 12, this cylinder is deformed into a cone (see FIG. 5). Alternatively, according to a further embodiment of the invention, the clamping tongues 7 may have a truncated conical contour at their ends from the outset, to cooperate with a corresponding cylindrical back rest on the pressing screw 9, so that the originally truncated conical bent ends of the clamping tongues are pressed against the cable 16. The illustrated embodiment of a device for holding cables or the like is in the form of a so-called "screw-type cable fitting". The pressing screw 9 may alternatively be in the form of a non-screwable pressure component, which for example may be clamped together with the mounting socket 1 in the manner of a bayonet connector or with the help of a dovetail guide and spring loading. In this way, the clamping tongues 6 and gasket 8 may again be pressed against the cable 16 in an analogous manner. A known kinking protector, for example in the form of a spiral spring or a nozzle of elastic material, may also be disposed on the pressing screw 9 or a corresponding pressure element.

The device according to the invention is of a very low manufacturing cost. It requires little space and needs only a short screwing stroke in the axial direction to hold various thicknesses of cable. Electrical insulation and mechanical loading capacity satisfy practical requirements. The clamping tongues tighten around the cable causing damage. Because of the fact that the clamping tongues slide over each other, they ensure a wide clamping region on being subjected to axial counter-pressure. In addition, the clamping tongues fix and centre the hollow cylindrical gasket, so that it becomes undetachably held. The clamping tongues also provide protection against rotation of the pressing screw. As the device according to the invention consists of only a very few parts, it is easily assembled. At the same time, by this means stock keeping is made simpler. The stress relief operated by the clamping tongues gives no danger of injry. Because of the seal profile on the pressure collar, special seal elements in this position are not required. This also provides for easier stock keeping.

I claim:

1. A clamping device for positively anchoring cables, leads, hoses and the like, comprising a hollow cylindrical mounting socket for receiving therethrough a cable to be clamped, a plurality of clamping tongues formed integrally and peripherally at one end of said socket and having free ends, an annular gasket peripherally enclosed by the clamping tongues, said socket having an external screw threaded portion adjacent to said one end thereof, an internally screw threaded pressurizing member threaded onto said external screw threaded portion of said socket, said pressurizing member having an annular cam surface extending radially inwardly at an inner end thereof for engaging and deforming said tongues as said pressurizing member is threaded onto said socket to press said gasket against the cable to clamp the cable with respect to the socket, said cam surface of said pressurizing member being formed with a longitudinally extending step for positively engaging a longitudinal edge of an overlapping clamping tongue to inhibit rotary movement of said pressurizing member relative to said socket after said pressurizing member has been assembled on said socket.

2. A clamping device as in claim 1 in which said step is formed by a notch which receives said longitudinal edge of a clamping tongue.

3. A clamping device as in claim 1 in which each of said socket and said pressurizing member are formed from polyamide.

4. A device as claimed in claim 3, wherein the clamping tongues are disposed in the form of a ring coaxial with the mounting socket and are separated by slots.

5. A device as claimed in claim 4, wherein the annular gasket consists of an elastomer.

6. A device as claimed in claim 1, wherein a pressure collar with a seal profile is provided on the mounting socket.

7. A device as claimed in claim 6, wherein the seal profile comprises concentric seal ribs of rounded rectangular.

8. A clamping device as in claim 6 wherein the seal profile comprises concentric seal ribs of triangular cross-section.

* * * * *